(12) United States Patent
Gerba et al.

(10) Patent No.: US 9,860,609 B2
(45) Date of Patent: *Jan. 2, 2018

(54) DISPLAYING ADVERTISING IN AN ELECTRONIC PROGRAM GUIDE

(71) Applicant: Cumnor Technologies LLC, Wilmington, DE (US)

(72) Inventors: George Gerba, Venice, CA (US); Michael R. Nichols, Altadena, CA (US)

(73) Assignee: Cumnor Technologies, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/071,826

(22) Filed: Mar. 16, 2016

(65) Prior Publication Data

US 2016/0269804 A1    Sep. 15, 2016

Related U.S. Application Data

(63) Continuation of application No. 13/939,947, filed on Jul. 11, 2013, now Pat. No. 9,294,823, which is a continuation of application No. 12/580,048, filed on Oct. 15, 2009, now Pat. No. 8,490,134, which is a
(Continued)

(51) Int. Cl.
| | |
|---|---|
| *H04N 21/472* | (2011.01) |
| *H04N 21/81* | (2011.01) |
| *H04N 21/4722* | (2011.01) |
| *G06F 3/0485* | (2013.01) |
| *G06F 3/0482* | (2013.01) |

(Continued)

(52) U.S. Cl.
CPC ......... *H04N 21/812* (2013.01); *G06F 3/0482* (2013.01); *G06F 3/0485* (2013.01); *H04N 21/4314* (2013.01); *H04N 21/4722* (2013.01); *H04N 21/47214* (2013.01); *H04N 21/4821* (2013.01); *H04N 21/8133* (2013.01)

(58) Field of Classification Search
CPC ......... H04N 21/47214; H04N 21/4722; H04N 21/4821; G06F 3/0482; G06F 3/0485
USPC ...................................... 725/52, 58
See application file for complete search history.

(56) References Cited

U.S. PATENT DOCUMENTS

| | | |
|---|---|---|
| 4,723,212 A | 2/1988 | Mindrum et al. |
| 4,882,675 A | 11/1989 | Nichtberger et al. |
| 5,038,211 A | 8/1991 | Hallenbeck |

(Continued)

FOREIGN PATENT DOCUMENTS

| | | |
|---|---|---|
| CA | 2419780 A1 | 8/2001 |
| EP | 1329099 B1 | 10/2008 |

(Continued)

OTHER PUBLICATIONS

Advisory Action Before the Filing of an Appeal Brief for U.S. Appl. No. 09/929,506 dated Jan. 31, 2007; 3 pages.
(Continued)

*Primary Examiner* — Dominic D Saltarelli
(74) *Attorney, Agent, or Firm* — Volpe and Koenig, P.C.

(57) ABSTRACT

Displayed program cells may be moved on an interactive program guide during a first time period based on a received first parameter. A displayed advertisement may be kept stationary during a second time period based on a second parameter. The second time period may be related to a subset of the displayed program cells which will move past the stationary advertisement.

15 Claims, 16 Drawing Sheets

Related U.S. Application Data continuation of application No. 09/929,506, filed on Aug. 14, 2001, now Pat. No. 7,634,789.

(60) Provisional application No. 60/283,921, filed on Apr. 16, 2001, provisional application No. 60/225,209, filed on Aug. 14, 2000.

(51) Int. Cl.
*H04N 21/431* (2011.01)
*H04N 21/482* (2011.01)

(56) References Cited

U.S. PATENT DOCUMENTS

| | | |
|---|---|---|
| 5,168,353 A | 12/1992 | Walker et al. |
| 5,353,121 A | 10/1994 | Young et al. |
| 5,416,508 A | 5/1995 | Sakuma et al. |
| 5,428,733 A | 6/1995 | Carr |
| 5,434,965 A | 7/1995 | Matheny et al. |
| 5,550,576 A | 8/1996 | Klosterman |
| 5,559,548 A | 9/1996 | Davis et al. |
| 5,585,866 A | 12/1996 | Miller et al. |
| 5,589,892 A | 12/1996 | Knee et al. |
| 5,594,509 A | 1/1997 | Florin et al. |
| 5,600,573 A | 2/1997 | Hendricks et al. |
| 5,627,958 A | 5/1997 | Potts et al. |
| 5,629,733 A | 5/1997 | Youman et al. |
| 5,635,978 A | 6/1997 | Alten et al. |
| 5,666,645 A | 9/1997 | Thomas et al. |
| 5,727,174 A | 3/1998 | Aparicio, IV et al. |
| 5,752,058 A | 5/1998 | Van De Vanter |
| 5,781,246 A | 7/1998 | Alten et al. |
| 5,808,608 A | 9/1998 | Young et al. |
| 5,809,204 A | 9/1998 | Young et al. |
| 5,818,438 A | 10/1998 | Howe et al. |
| 5,857,212 A | 1/1999 | Van De Vanter |
| 5,886,694 A | 3/1999 | Breinberg et al. |
| 5,892,508 A | 4/1999 | Howe et al. |
| 5,905,942 A | 5/1999 | Stoel et al. |
| 5,940,073 A | 8/1999 | Klosterman et al. |
| 5,943,049 A | 8/1999 | Matsubara et al. |
| 5,949,954 A | 9/1999 | Young et al. |
| 6,064,376 A | 5/2000 | Berezowski et al. |
| 6,075,575 A | 6/2000 | Schein et al. |
| 6,078,348 A | 6/2000 | Klosterman et al. |
| 6,118,451 A | 9/2000 | Alexander |
| 6,151,059 A | 11/2000 | Schein et al. |
| 6,177,931 B1 | 1/2001 | Alexander et al. |
| 6,199,080 B1 | 3/2001 | Nielsen |
| 6,201,536 B1 | 3/2001 | Hendricks et al. |
| 6,256,785 B1 | 7/2001 | Klappert et al. |
| 6,388,714 B1 | 5/2002 | Schein et al. |
| 6,392,673 B1 | 5/2002 | Andrew et al. |
| 6,407,759 B1 | 6/2002 | Kanungo et al. |
| 6,445,398 B1 | 9/2002 | Gerba et al. |
| 6,452,611 B1 | 9/2002 | Gerba et al. |
| 6,469,753 B1 | 10/2002 | Klosterman et al. |
| 6,492,997 B1 | 12/2002 | Gerba et al. |
| 6,584,479 B2 | 6/2003 | Chang et al. |
| 6,670,971 B1 | 12/2003 | Oral |
| 6,772,433 B1 | 8/2004 | LaJoie et al. |
| 6,799,327 B1 | 9/2004 | Reynolds et al. |
| 7,500,202 B2 | 3/2009 | Gerba et al. |
| 7,634,789 B2 | 12/2009 | Gerba et al. |
| 2002/0175916 A1 | 11/2002 | Nichols et al. |
| 2003/0055851 A1 | 3/2003 | Williamson et al. |
| 2003/0088483 A1 | 5/2003 | Moyer |
| 2003/0095791 A1 | 5/2003 | Barton et al. |
| 2003/0097657 A1 | 5/2003 | Zhou et al. |
| 2006/0010469 A1 | 1/2006 | Reynolds et al. |
| 2010/0223640 A1 | 9/2010 | Reichardt et al. |

FOREIGN PATENT DOCUMENTS

| | | |
|---|---|---|
| WO | 9749242 A1 | 12/1997 |
| WO | 9827723 A1 | 6/1998 |
| WO | 9904561 A1 | 1/1999 |
| WO | 9929100 A1 | 6/1999 |
| WO | 9945700 A1 | 9/1999 |
| WO | 9945702 A1 | 9/1999 |
| WO | 9956466 A1 | 11/1999 |
| WO | 9956473 A1 | 11/1999 |
| WO | 0002380 A2 | 1/2000 |
| WO | 0049801 A1 | 8/2000 |
| WO | 0067473 A1 | 11/2000 |
| WO | 0079798 A1 | 12/2000 |
| WO | 0119086 A2 | 3/2001 |
| WO | 0122719 A2 | 3/2001 |
| WO | 0150743 A1 | 7/2001 |
| WO | 0215571 A1 | 2/2002 |
| WO | 02084472 A1 | 10/2002 |
| WO | 02084535 A1 | 10/2002 |

OTHER PUBLICATIONS

Advisory Action Before the Filing of an Appeal Brief for U.S. Appl. No. 10/124,761 dated Sep. 14, 2007; 3 pages.

Amendment and Response to Office Action for U.S. Appl. No. 09/929,506 dated Dec. 5, 2007; 4 pages.

Amendment and Response to Office Action for U.S. Appl. No. 10/124,527 dated Mar. 8, 2005; 19 pages.

Amendment and Response Under 37 CFR 1.111 for U.S. Appl. No. 09/929,506 dated Apr. 15, 2009; 10 pages.

Amendment for U.S. Appl. No. 10/124,761 dated Jan. 29, 2007; 9 pages.

Amendment under 37 CFR 1.111 for U.S. Appl. No. 09/929,506 dated Aug. 21, 2006; 14 pages.

Amendment under 37 CFR 1.111 for U.S. Appl. No. 09/929,506 dated Mar. 6, 2006; 13 pages.

Amendment under 37 CFR 1.114 for U.S. Appl. No. 09/929,506 dated Apr. 5, 2007; 7 pages.

Appeal Brief under 37 CFR 41.37 for U.S. Appl. No. 10/124,761 dated Apr. 21, 2008; 17 pages.

Board of Patent Appeals and Interferences Docketing Notice for U.S. Appl. No. 10/124,761 dated May 15, 2009; 2 pages.

Canadian Office Action for Application 2419780 dated Feb. 13, 2009; 4 pages.

European Patent Office Communication for Application No. 01963980.6 dated Apr. 26, 2005; 6 pages.

European Patent Office Communication for Application No. 01963980.6 dated Sep. 2, 2005; 5 pages.

Examiner's Answer for Application No. 10/124,761 dated Sep. 30, 2008; 17 pages.

Final Office Action for U.S. Appl. No. 09/929,506 dated Jan. 30, 2008; 11 pages.

Final Office Action for U.S. Appl. No. 09/929,506 dated Oct. 5, 2006; 24 pages.

Final Office Action for U.S. Appl. No. 10/124,527 dated Jun. 1, 2005; 8 pages.

Final Office Action for U.S. Appl. No. 10/124,527 dated Sep. 11, 2006; 11 pages.

Final Office Action for U.S. Appl. No. 10/124,761 dated Apr. 19, 2007; 14 pages.

Final Office Action for U.S. Appl. No. 10/124,761 dated Jun. 14, 2005; 14 pages.

International Search Report for Application No. PCT/US02/11949 dated Sep. 17, 2002; 1 page.

International Search Report for Application No. PCT/US02/11957 dated Jul. 17, 2002; 4 pages.

Lee et al., User Interface Issues for Browsing Digital Video, School of Computer Applications, Dublin City University, Glasnevin, Dublin 9, Ireland, dated 1999 (11 pages).

Little et al., "A Digital On-Demand Video Service Supporting Content-Based Queries," Boston University, undated (10 pages).

McDonald et al., "Online Television Library: Organisation and Content Browsing for General Users," Centre for Digital Video

(56) References Cited

OTHER PUBLICATIONS

Processing, Dublin City University, Ireland, undated (9 pages).
Non-Final Office Action for U.S. Appl. No. 09/929,506 dated Apr. 19, 2006; 26 pages.
Non-Final Office Action for U.S. Appl. No. 09/929,506 dated Jun. 5, 2007; 11 pages.
Non-Final Office Action for U.S. Appl. No. 09/929,506 dated Oct. 15, 2008; 12 pages.
Non-Final Office Action for U.S. Appl. No. 09/929,506 dated Oct. 5, 2005; 30 pages.
Non-Final Office Action for U.S. Appl. No. 10/124,527 dated Oct. 5, 2004; 11 pages.
Non-Final Office Action for U.S. Appl. No. 10/124,761 dated Jul. 27, 2006; 16 pages.
Non-Final Office Action for U.S. Appl. No. 10/124,761 dated Nov. 3, 2004; 14 pages.
Non-Final Rejection dated Nov. 14, 2012, in U.S. Appl. No. 12/580,048.
Notice of Abandonment for U.S. Appl. No. 10/124,527 dated May 21, 2007; 2 pages.
Notice of Allowance dated Mar. 15, 2013, in U.S. Appl. No. 12/580,048.
Notice of Appeal from the Examiner to the Board of Patent Appeals and Interferences for U.S. Appl. No. 10/124,761 dated Oct. 19, 2007; 1 page.
Notice of Panel Decision from Pre-Appeal Brief Review for U.S. Appl. No. 10/124,761 dated May 15, 2006; 2 pages.
Notification of Transmittal of the International Search Report or the Declaration for Application No. PCT/US01/25399 dated Nov. 16, 2001; 5 pages.
Office Communication for U.S. Appl. No. 10/124,761 dated Oct. 17, 2008; 2 pages.
Pre-Appeal Brief Request for Review for U.S. Appl. No. 10/124,761 dated Nov. 14, 2005; 6 pages.
Response Pursuant to 37 CFR 1.114 for U.S. Appl. No. 10/124,527 dated Jun. 5, 2006; 5 pages.
Response to Canadian Office Action for Application No. 2419780 dated Aug. 13, 2009; 5 pages.
Response to European Office Acton for Application No. 01963980.6 dated Mar. 10, 2006, 11 pages.
Response to Final Office Action for U.S. Appl. No. 09/929,506 dated Jan. 5, 2007; 8 pages.
Response to Final Office Action for U.S. Appl. No. 09/929,506 dated Jul. 28, 2008; 11 pages.
Response to Office Action for U.S. Appl. No. 10/124,761 dated Aug. 20, 2007; 7 pages.
Response to Office Action for U.S. Appl. No. 10/124,761 dated May 3, 2005; 6 pages.
Response to Written Opinion for Application No. PCT/US01/25399 dated Feb. 12, 2003; 4 pages.
Written Opinion for Application No. PCT/US01/25399 dated Dec. 12, 2002; 5 pages.
Non-Final Rejection, U.S. Appl. No. 13/939,947, dated Sep. 12, 2014.
Final Rejection, U.S. Appl. No. 13/939,947, dated Jan. 9, 2015.
Non-Final Rejection, U.S. Appl. No. 13/939,947, dated Jul. 15, 2015.
Notice of Allowance, U.S. Appl. No. 13/939,947, dated Nov. 9, 2015.

| | 7:00 PM | 7:30 PM | 8:00 PM |
|---|---|---|---|
| A&E | PROGRAM_19 | PROGRAM_20 | PROGRAM_21 |
| ADVERTISEMENT | AD_1 | | AD_2 |
| AMC | PROGRAM_22 | | |
| CNN | PROGRAM_23 | | PROGRAM_24 |
| SHOWTIME | | PROGRAM_25 | |
| PLAYBOY | | PROGRAM_26 | |
| HISTORY | PROGRAM_27 | | PROGRAM_28 |

300 GRID

312 AD ROW

FIG. 11

|  | 7:00 PM | 7:30 PM | 8:00 PM |
|---|---|---|---|
| AMC | PROGRAM_22 | | |
| CNN | PROGRAM_23 | | PROGRAM_24 |
| SHOWTIME | PROGRAM_25 | | |
| PLAYBOY | PROGRAM_26 | | |
| HISTORY | PROGRAM_27 | | PROGRAM_28 |
| CNBC | PROGRAM_29 | | PROGRAM_30 |
| ADVERTISEMENT | AD_3 | AD_4 | AD_5 |

300 GRID

312' AD ROW

FIG. 12

| | 7:00 PM | 7:30 PM | 8:00 PM |
|---|---|---|---|
| ADVERTISEMENT | AD_6 | | AD_7 |
| CBS | PROGRAM_1 | | PROGRAM_2 |
| NBC | PROGRAM_3 | PROGRAM_4 | PROGRAM_5 |
| ABC | PROGRAM_6 | PROGRAM_7 | |
| DISNEY | PROGRAM_8 | | |
| HBO | PROGRAM_9 | | |
| BRAVO | PROGRAM_10 | | |

300 GRID

TOP SCHEDULE ROW 328

FIG. 13

| | 5:30 PM | 6:00 PM | 6:30 PM |
|---|---|---|---|
| CBS | PROGRAM_31 | | PROGRAM_1 |
| NBC | PROGRAM_32 | PROGRAM_3 | |
| ABC | PROGRAM_6 | | |
| ADVERTISEMENT | AD_1 | | AD_2 |
| DISNEY | PROGRAM_33 | | |
| HBO | PROGRAM_34 | | |
| BRAVO | PROGRAM_35 | | |

300 GRID
302 TOP ROW
312 AD ROW

FIG. 14

| | 7:30 PM | 8:00 PM | 8:30 PM |
|---|---|---|---|
| CBS | PROGRAM_1 | PROGRAM_2 | |
| NBC | PROGRAM_4 | PROGRAM_5 | |
| ABC | PROGRAM_7 | | |
| ADVERTISEMENT | AD_1 | AD_2 | |
| DISNEY | PROGRAM_8 | PROGRAM_36 | |
| HBO | PROGRAM_9 | | |
| BRAVO | PROGRAM_10 | PROGRAM_37 | |

300 GRID
302 TOP ROW
312 AD ROW

FIG. 15

| | 5:30 PM | 6:00 PM | 6:30 PM | | | | 302 TOP ROW |
|---|---|---|---|---|---|---|---|
| CBS | PROGRAM_31 | | PROGRAM_1 | | | | |
| NBC | PROGRAM_32 | PROGRAM_3 | | | | | |
| ABC | PROGRAM_6 | | | | | | |
| ADVERTISEMENT | AD_8 | | | | | | 312" AD ROW |
| DISNEY | PROGRAM_33 | | | | | | |
| HBO | PROGRAM_34 | | | | | | |
| BRAVO | PROGRAM_35 | | | | | | |

300 GRID

FIG. 16

|  | 7:30 PM | 8:00 PM | 8:30 PM |
|---|---|---|---|
| CBS | PROGRAM_1 | PROGRAM_2 | |
| NBC | PROGRAM_4 | PROGRAM_5 | |
| ABC | PROGRAM_7 | | |
| ADVERTISEMENT | AD_2 | AD_9 | |
| DISNEY | PROGRAM_8 | PROGRAM_36 | |
| HBO | PROGRAM_9 | | |
| BRAVO | PROGRAM_10 | PROGRAM_37 | |

300 GRID, 302 TOP ROW, 312$^{th}$ AD ROW

FIG. 17

| 300 GRID | 7:00 PM | 7:30 PM | 8:00 PM | |
|---|---|---|---|---|
| CBS | PROGRAM_1 | | PROGRAM_2 | |
| NBC | PROGRAM_3 | PROGRAM_4 | PROGRAM_5 | TEXT AND/OR IMAGES OF AD_1 |
| ABC | PROGRAM_6 | PROGRAM_7 | | |

FIG. 18

```
ad__table ( )                                          // rolling 12 hour tables
{
    table_version(8);
    format_version(8);
    block_size(16);
    offset_start_date_time(49);                        // 32bits BCD date; 16bits minutes from midnight
    display_page_size_tv(16);                          // The number of rows between Ad Banners in the Guide
    display_page_sies_ec(16);                          // The number of rows between Ad Banners in the Guide
    display_page_site_croads(16);                      // The number of rows between Ad Banners in the Guide
    lst_fixed_loop_size(16);
    record_count(16);
    for (I=0;i<record_count;I++)                       // Ordered by time, then rotation sequence
    {
        lineup_bitmap(24);                             // 1st cut of Regional requirement
        navigator_zone(8);                             // Navigator zone in which this ad appears
        navigator_level(8);                            // Navigator level in which this ad appears
        start_time(16);                                // minutes from offset_start_date_time
        stop_time(16);                                 // minutes from offset_start_date_time
        cycle_duration(16);                            // in minutes [0, ..., 65535]
        asset_type_part1(8);                           // type for initially viewable portion of ad
        asset_id_part1(16);                            // asset ID for initially viewable portion of ad
        asset_type_part2(8);                           // type for extended lens portion of ad
        asset_id_part2(16);                            // asset ID for extended lens portion of ad
        asset_type_PIP(8);                             // type for PIP portion of the ad
        asset_id_PIP(16);                              // asset ID for PIP portion of the ad
        priority(8);                                   // Supports Ad rotation by priority
        intended_audience_bitmask(64);                 // support for audience targeted ads
        category_id1(16);                              // support for Navigator Guide sort mapping
        category_id2(16);                              // support for Navigator Guide sort mapping
        category_id3(16);                              // support for Navigator Guide sort mapping
        category_id4(16);                              // support for Navigator Guide sort mapping
        ad_type(8);                                    // defines only the high level ad type
        beg_display_row(16);                           // for ad types 0x01, 0x02, 0x04, 006 and 0x07
        end_display_row(16);                           // for ad types 0x01, 0x02, 0x04, 0x06 and 007
        display_row_package_count(8);                  // for ad types 0x01, 0x02, 0x04, 0x06 and 0x07
        position_service_id(16);                       // used by ad types 0x03 and 0x05
        h_position(16);                                // Stub for Phase 3 ad position information
        v_position(16);                                // Stub for Phase 3 ad position information
        opacity(8);                                    // Stub for Phase 3 ad opacity information
        action_type(8);                                // specifies "G" key functionality
        service_id(16);                                // used by action type 0x02
        event_date_time(48);                           // used by action type 0x02
        marquee_id(16);                                // used by action type 0x03
        product_id(64);                             // used by action, type 0x04
        virtual_page_id(16);                        // used by action type 0x05
        variable_data_offset(32);
    }
// (0 == variable data offset) points to here
variable_data_count(16);                               // variable data count
for (j=0;j<variable_data_count;j++)
{
                                                       // eliminate duplicates in this loop
    <<variable_data>>
    url_string_length(16);
    url_string(-);                                     // the URL associated with the action or ad
    display_row_package_length(16);                    // ranges within or rows at which ads are displayable
    for (k=0; k<display_row_package_count; k++)
    {
        beg_display_row_range(k)(16);
        end_display_row_range(k)(16);
    }
    ad_part1_text_length(16);
    ad_part1_text(-);
    ad_part2_text_length(16);
    ad_part2_text(-);
    }
}
```

FIG. 20

DISPLAYING ADVERTISING IN AN ELECTRONIC PROGRAM GUIDE

CROSS REFERENCE TO RELATED APPLICATION(S)

This application is a continuation of U.S. patent application Ser. No. 13/939,347 filed Jul. 11, 2013, which is a continuation of U.S. patent application Ser. No. 12/580,048, filed Oct. 15, 2009, which issued as U.S. Pat. No. 8,490,134 on Jul. 16, 2013, which is a continuation of U.S. patent application Ser. No. 09/929,506, filed Aug. 14, 2001, which issued as U.S. Pat. No. 7,634,789 on Dec. 15, 2009, which claims the benefit of U.S. Provisional Application Ser. No. 60/283,921, filed Apr. 16, 2001 and U.S. Provisional Application Ser. No. 60/225,209 filed Aug. 14, 2000, all of which are incorporated by reference as if fully set forth.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

RELATED APPLICATIONS

This application is related to patent application Ser. No. 09/018,541, titled METHOD AND SYSTEM FOR NAVIGATING THROUGH CONTENT IN AN ORGANIZED AND CATEGORIZED FASHION, filed Feb. 4, 1998, now abandoned, which is hereby incorporated by reference into this application in its entirety.

This application is related to patent application Ser. No. 09/103,317, titled METHOD AND SYSTEM FOR PROVIDING USER INTERFACE FOR ELECTRONIC PROGRAM GUIDE, filed Jun. 24, 1998, now U.S. Pat. No. 6,445,398, which is hereby incorporated by reference into this application in its entirety.

BACKGROUND OF THE INVENTION

The present invention disclosed herein relates generally to electronic program guides. More particularly, the present invention relates to a system and method for displaying more effective banner and tune-in ads in an interactive program guide.

The number of video channels that offer various programming content, including the Internet and other on-line content, continues to increase. Channel surfing is no longer a viable solution for viewers to find an interesting program by sequentially or randomly examining every channel. As a result, electronic program guides (EPG) that continuously list channels and their content televised at a particular time will become practically indispensable for viewers.

Because of this necessity to use an electronic program guide, an opportunity is presented to advertise various products and services in the EPG contemporaneously with program schedule data. Examples of the use of advertising with programs guides are shown in International Application No. PCT/US97/23852 titled "EPG with Advertising Inserts," and U.S. Pat. No. 5,940,073 titled "Method and System for Displaying Other Information in a TV Program Guide," both of which are hereby incorporated by reference into this application. PCT application PCT/US97/23852 discusses the insertion of an advertisement between television program listings in an EPG screen. The advertisement appears as a single line in the program guide grid and scrolls or otherwise moves along with and in identical fashion as the rest of the program listings. U.S. Pat. No. 5,940,073 discusses an EPG having an area on the EPG display, separate from the program listings portion of the display, for advertising programs, products and services, where the advertising information changes as the user moves the EPG cursor from cell to cell or after the passage of a predetermined number of seconds.

In both cases, users are shown advertisements on the same screen as the program guide listings. However, neither reference is particularly sensitive to user viewing behavior, especially in the use of EPGs. Placing an advertisement in a separate region of the EPG display from the program guide listings requires a user to turn his or her eyes away from the program guide listings to view the advertisement. Since users pull up the EPG specifically to see the program guide listings, and usually only for a short period until a desired program to view is located, they are unlikely to pay any particular attention to the advertisement appearing on a separate portion of the display. Placing the advertisement in the program listings portion of the display appears to overcome this problem; however, users are likely to pay only brief attention to the ad as it scrolls past while searching through the program guide listings.

A need therefore continues to exist for an improved system and method that presents schedule data and advertising data to viewers in an effective but unobtrusive and flexible manner.

BRIEF SUMMARY OF THE INVENTION

The present invention provides a system and method for contemporaneously displaying schedule data and advertising data in an interactive program guide in a fashion which increases the likelihood of receiving user attention to the advertisement, but which keeps the ad from becoming obtrusive or annoying to the user. The advertising data may be related to programs scheduled for broadcast and time slots at which programs are scheduled for broadcast. As such, the advertisement may serve as a "tune-in" ad for upcoming programming.

One embodiment of the invention provides a method of displaying advertising in an electronic program guide on a display device, the electronic program guide having at least a list of program cells each containing a program choice available for viewing. The method includes scrolling the list of program cells on the display device in a first direction in accordance with a first scrolling scheme, displaying an advertisement cell within the list of program cells, and moving the advertisement cell in the first direction as the list of program cells scrolls, the advertisement cell moving in accordance with a second scheme different than the first scrolling scheme. The advertisement cell's scrolling scheme may be controlled from a remote location, such as by transmitting parameters for the scrolling scheme from a head end of a cable system to subscribers or such other comparable central station in a satellite, microwave or other television distribution system.

In particular embodiments, the second scrolling scheme involves scrolling the advertisement cell in concurrence with the scrolling of the program cell list during a first time portion in which the program cell list scrolls and keeping the advertisement cell stationary during a second time portion in which the program cell list scrolls. The scrolling may be in the vertical, horizontal or other direction on the display device. The second time portion may be determined based upon a first number of program cells which have moved past the advertisement cell while the advertisement cell is kept stationary, with the first number of program cells being received from a remote location.

In addition to or as an alternative to this embodiment, the second scheme may include scrolling the advertisement cell in concurrence with the scrolling of the program cell list during a first time portion in which the program cell list scrolls and scrolling the advertisement cell during a second time portion in which the program cell list is stationary. This may occur, for example, in a system in which a highlight cell is displayed on the display device such that program and advertisement cells may enter the highlight cell. The advertisement cell may then be scrolled while the program cell list is kept stationary when the advertisement cell is entered in the highlight cell.

In some embodiments, the advertisement cell operates according to different scrolling schemes of these types for both vertical and horizontal directions in the program guide grid.

The highlight cell may be a fixed, stationary highlight cell in which the entire program guide moves behind the cell and program choices and the advertisement cell enter and leave the cell. Alternatively, the highlight cell may be a movable cursor or similar graphical user interface mechanism in which the program guide moves when the cursor reaches an extremity of the guide, such as the top or bottom thereof, to reveal more cells not previously visible on the display device. These new program choices may enter the screen one cell at a time or one page at a time; in either instance, the movement is generally referred to herein as scrolling.

In particular embodiments, the first direction is a vertical scrolling direction on the display device, and the program cell list contains a top cell and a bottom cell displayed on the display device. Keeping the advertisement cell stationary may then involve keeping the advertisement cell stationary when the advertisement cell reaches the top or bottom cell of the program cell list.

An advertisement is inserted into the advertisement cell. The advertisement may contain text, graphics, animation, or other multimedia components. In particular embodiments, the inserted advertisement is related to one or more program cells displayed in the program guide on the display screen. The advertisement may be replaced in the advertisement cell with another advertisement when the program choices displayed in the program guide change due to scrolling of the program cells. Advertisements may alternatively be attached to a particular channel. Also, the electronic program guide may contain program choices available for viewing at scheduled times, as opposed, for example, to program choices available on demand. The program cells would be arranged according to the scheduled times of the program choices, and the advertisement inserted into the advertisement cell may be for a program choice available for viewing at a time close in time to the scheduled times of program choices displayed on the display screen, such as an hour or two from the currently displayed time or later that evening.

The present invention further includes a method for providing an interactive program guide including schedule data and advertising data for display on a screen. According to the present invention, the schedule data is arranged into a grid containing rows and columns according to a listing of channels and starting times of programs that are broadcast via the channels. A plurality of cells is thus formed containing names of the programs. The advertising data is inserted into a predetermined row of the grid for display on the screen. Using a remote control, a viewer scrolls the schedule data in the grid to view the listing of other channels and the starting times of other programs broadcast via the other channels. While the viewer scrolls the schedule data, the advertising data remains on the screen in the predetermined row of the grid.

The advertising data is arranged into cells such that one or more advertising cells are displayed in the predetermined row of the grid. In accordance with one aspect of the present invention, each advertising cell contains an advertisement related to the starting times of the programs displayed on the screen. In accordance with another aspect of the present invention, each advertising cell contains an advertisement related to the channels substantially adjacent the predetermined row containing the advertising data displayed on the screen.

The present invention further includes improved user interface designs for an interactive program guide. According to one embodiment, the improved user interface contains a listing of program choices arranged in at least one row or column on a display device, the listing being navigated by a user through scrolling in accordance with a first scrolling scheme, and an advertisement cell contained within the program listing column or row. The advertisement cell is configured to move on the display device in accordance with a second scrolling scheme, the second scrolling scheme being different than the first scrolling scheme. In addition, a list of service identifiers, such as television channel numbers or operators, is displayed in association with the program choices in the program choice listings, and an advertisement identifier, such as the word "AD," is contained in the list of service identifiers and displayed in association with the advertisement cell. Thus, the content of the advertisement cell is clearly identifying as an ad and not necessarily a program choice such as may otherwise be displayed in a currently scheduled time slot in the guide.

Another embodiment of a user interface for an interactive program guide includes a set of first program cells arranged in at least one row or column on a display device, the set being navigated by a user through scrolling in accordance with a first scrolling scheme, and at least one second program cell arranged within the column or row, the second program cell being configured to move on the display device in accordance with a second scrolling scheme, the second scrolling scheme being different than the first scrolling scheme. A stationary highlight cell may be positioned over a portion of the column or row of program cells, wherein scrolling of the column or row causes one of the cells to enter the highlight cell, the stationary highlight cell being operative to allow user selection of a program cell entered in the highlight cell. The second program cell may be larger than the first program cells, and the stationary highlight cell then expands to accommodate the second program cell when the second program cell enters the highlight cell.

Another embodiment of a user interface for an interactive program guide includes a plurality of program cells arranged in at least one row or column on a display device and an advertisement cell contained within the program cell column or row. The program cells and the advertisement cell are configured to move on the display device in response to user input.

During a first time period the program cells and advertisement cell move in concurrent fashion and during a second time period the program cells or advertisement cell remain stationary on the display device during movement of the other of the advertisement cell or program cells, respectively.

Another embodiment consists of a user interface for an interactive program guide with an advertisement in the guide whose movement is partially controlled from a remote location such as a cable system head end. The guide includes a plurality of program cells arranged in at least one row or column on a display device and an advertisement cell contained within the program cell column or row. The program cells and the advertisement cell are configured to move on the display device in response to user input. The movement of the advertisement cell is controlled in part based on parameters addressed from the remote location.

BRIEF DESCRIPTION OF THE DRAWINGS

The present invention is illustrated in the figures of the accompanying drawings which are meant to be exemplary and not limiting, in which like reference characters are intended to refer to like or corresponding parts, and in which:

FIG. 11 shows a block diagram of the interactive program guide when the viewer scrolls the scheduling data up or down to view the scheduling information for other video channels and the advertising data in ad row 312 starts to move in the direction of the scrolling operation;

FIG. 12 shows a block diagram of the interactive program guide after the previous advertising data scrolls off the screen and new advertising data appears;

FIG. 13 shows a block diagram of the interactive program guide when the advertising data remains in the top schedule row until a predetermined number of rows is scrolled on the screen;

FIG. 14 shows a block diagram of the interactive program guide when the viewer activates the "left" function to scroll the scheduling data in grid 300 in the direction of arrow L in FIG. 9;

FIG. 15 shows a block diagram of the interactive program guide when the viewer activates the "right" function to scroll the scheduling data in grid 300 in the direction of arrow R in FIG. 9;

FIG. 16 shows a block diagram of the interactive program guide after the viewer moves the scheduling data in grid 300 to the left, and advertisement AD_1 and AD_2 are replaced by advertisement AD_8;

FIG. 17 shows a block diagram of the interactive program guide after the viewer moves the scheduling data in grid 300 to the right, AD_1 is replaced by AD_2, and AD_9 is inserted in place of AD_2;

FIG. 18 shows a block diagram of the interactive program guide after AD_1 is in the lens 318, and more extensive text and/or images pertaining to that advertisement (AD_1) appear on the screen;

FIG. 20 shows the data structure for a table for conveying ad data in accordance with one embodiment of the present invention.

DETAILED DESCRIPTION OF THE PREFERRED EMBODIMENTS

As a general overview, the present invention includes a system and method for providing advertisements in an interactive program guide. The interactive program guide is displayed on a monitor such as in the form of a grid that contains multiple rows and columns, thereby dividing the grid into a number of cells. Each row of data in the interactive program guide represents programming data provided on a specific channel at sequential times, and the columns of information in the grid represent different programs available within a given time slot. According to the present invention, at least one of the rows does not contain the names of programs starting at particular times, but instead contains advertising data. In one aspect of the present invention, the advertising data is related to a time slot in which the advertising data is displayed. In another aspect of the present invention, the advertising data may also be related to substantially adjacent channels displayed on the screen. In addition, the viewer may interact with the advertisements appearing in the interactive program guide. These as well as additional features of the advertisements in the interactive program guide according to the present invention are described in detail below.

Figure 1:
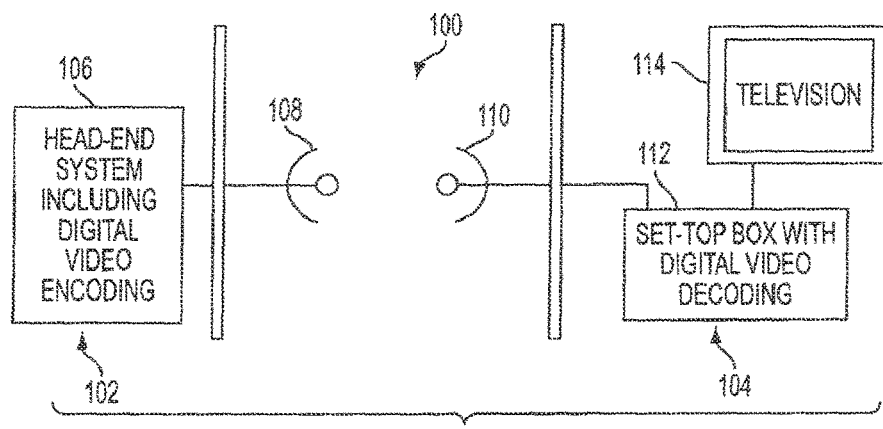
FIG. 1 shows a block diagram of a digital broadcast system in accordance with one embodiment of the present invention.

One embodiment of the present invention will now be described in detail with reference to the accompanying figures. In particular and as described in commonly owned U.S. Pat. No. 6,256,785, incorporated herein by reference, FIG. 1 shows a block diagram of a digital broadcast system 100 which includes a head end 102 and a receiving end 104. The head end 102 includes a head end system 106 coupled, in a representative embodiment, to a microwave transmission dish 108. The receiving end 104 includes microwave receiving antenna 110 coupled to a set-top box 112 which, in turn, is coupled to television monitor 114. The transmission in this embodiment is direct dish-to-dish microwave. Alternatively, the digital broadcast may be transmitted from the head end system 102 to a satellite, where the broadcast is "bounced" off for retransmission to the receiving end 104. Furthermore, a wire (cable) connection may be utilized as a digital broadcast medium. Those of skill in the art will appreciate that any conventional television distribution system may be used within the scope of the invention.

In operation, a digital video signal is generated at the head end system 106 and is transmitted from the microwave transmission dish 108. The digital video signal is received by the microwave receiving antenna 110 and is converted by the set top box 112 into a usable signal which is then input into the television monitor 114 for viewing. The set top box operates an application for generating a navigator user interface for selecting channels for viewing, the navigator including an electronic or interactive program guide. The operation of one such guide is described in the above referenced commonly owned patent application Ser. No. 09/103,317.

Figure 2:
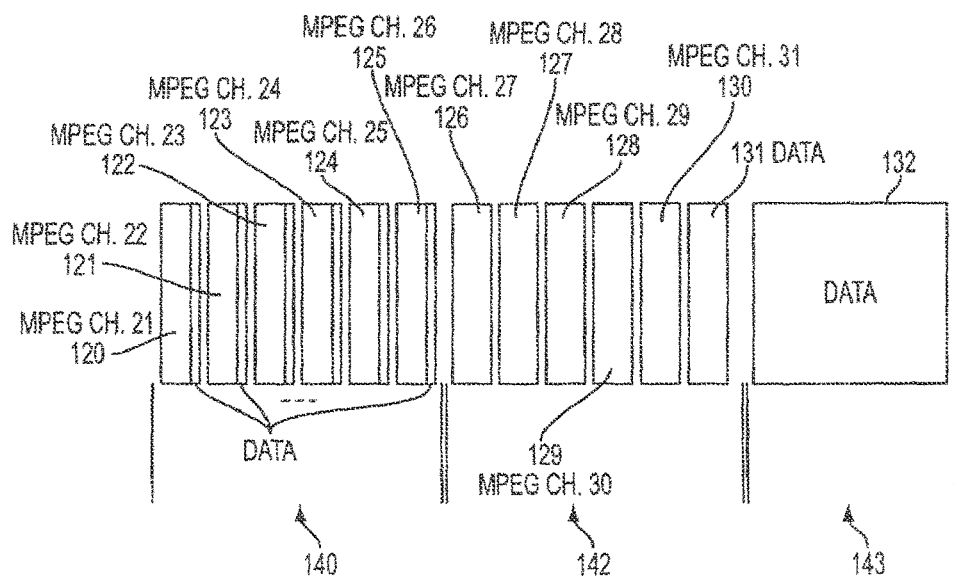
FIG. 2 illustrates several representative digital video channels and data channels representing signals which are generated, transmitted, received and processed by the digital broadcast system shown in FIG. 1.

Reference is next made to FIG. 2 which illustrates several digital video channels 120-130. As shown in FIG. 2, video channels 120-130 are representative of MPEG channels 21-31, respectively. Digital video channels 120-130 and data channel 131 are transmitted in tunable bandwidths represented by frequency bands 140 and 142. In this exemplary embodiment, frequency band 140 contains MPEG channels 21-26 (digital video channels 120-125), and frequency band 142 contains MPEG channels 27-31 (digital video channels 126-130). Each of the digital video channels can have data embedded in its stream of data as shown for the frequency band 140 in FIG. 2. Alternatively, a separate data channel 131 can be independent from each of the digital video channels 126-130 but within the same tunable bandwidth as in frequency band 142. Alternatively, the data can be put on a data dedicated frequency band which receives only data and no digital video channels, such as data 132 tunable within frequency band 143.

Frequency band 140 contains digital video channels 120-125 which include both video information and data. Frequency band 142 tunes digital video channels 126-130 and data channel 131. Data channel 131 includes a continuous stream of data that is then synchronized to the separate digital video channels 126-130. Alternatively, in the situation of frequency band 143, one dedicated frequency band is provided to receive only data bits. Data is stored in memory and synchronized with video when tuned to a frequency band that has video.

The above-mentioned data, either embedded in the video channels or separately provided therefrom, may include, among other things, scheduling data for use in an interactive or intelligent program guide (IPG). The guide is an interactive electronic program display which lists programs by channel and time as described in U.S. patent application Ser. No. 09/103,317 incorporated herein by reference. The viewer can navigate the guide with a remote control and can select or tag a program listed in the guide for immediate or later viewing.

Figure 3:
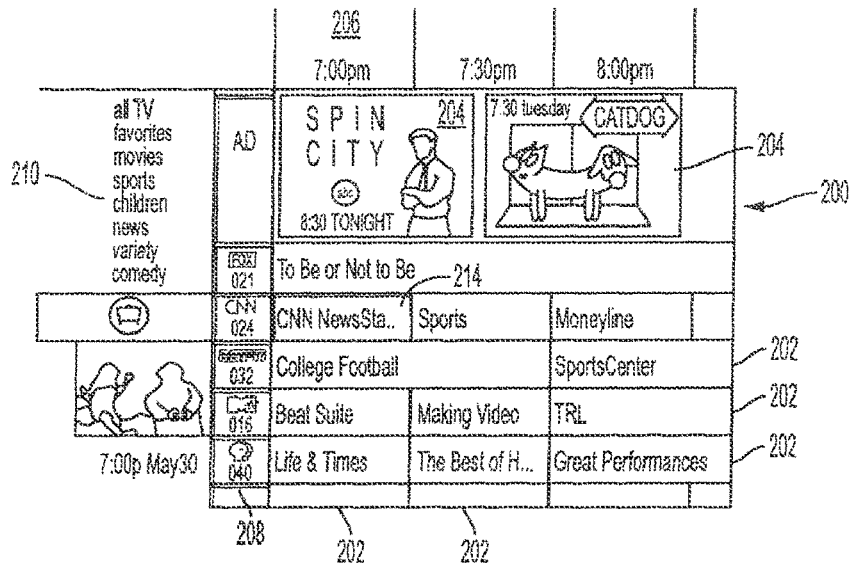
FIGS. 3-8 show exemplary screen displays of an interactive program guide screen having an advertisement in the program listings in accordance with embodiments of the present invention.

Exemplary screen displays for the IPG user interface of the present invention are shown in FIGS. 3-8. As shown in FIG. 3, this embodiment of an IPG consists of a grid 200 with program cells 202 having program choices contained therein, arranged in a two-dimensional grid of time 206 vs. channel 208. An advertisement cell or cells 204 are contained within the grid portion 200 of the IPG, with the word "AD" contained in the channel list 208 displayed adjacent the advertisement cell 204. The advertisement cell 204 is larger than the program cells 202, having in this case about the height of three program cells 202. The advertisement is a bitmapped graphic arranged either horizontally or vertically, and may further contain animated graphics, such as with animated GIFs, sprite animation such as Flash or Shockwave, or other technology as allowed by the set top box and operating system.

FIG. 3 shows two advertisements in the advertisement cells. One ad is for a television show "Spin City" airing at 8:30 p.m. that night. Note that the grid is currently displaying shows airing at 7:00 p.m., 7:30 p.m. and 8:00 p.m., so that this ad is for a show just to the future of the current time slot. The second ad is for a program called "CatDog" scheduled to air at 7:30 p.m. on Tuesdays. This again relates the time of the program featured in the ad to the currently displayed time 206 in the grid 200.

Figure 4:
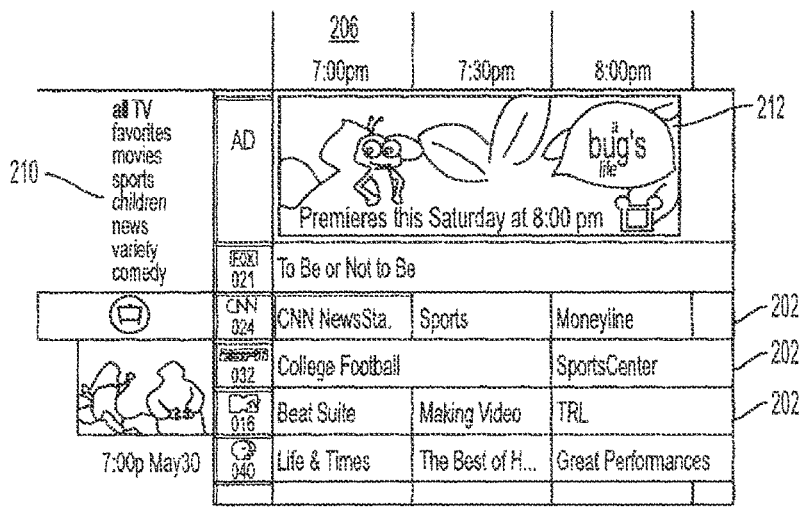

An alternative advertisement which may appear in the advertisement cell is shown in FIG. 4. This ad 212 is a large sized ad, filling up over two columns of the grid row with a single ad. This ad 212 features a movie called "A Bug's Life," scheduled to air at 8:00 p.m. on an upcoming Saturday. Here too, the ad relates in time to the time of the program cells in the IPG.

The IPG screen in FIG. 3 also features a pick list 210 of categories such as favorites, movies, sports, children, etc. The operation of this pick list is described in the above referenced patent applications.

Figure 5:

In accordance with one embodiment, the user enters the IPG screen with stationary highlight cell 214 (described in the above referenced application including Ser. No. 09/103,317) positioned over the last program that the viewer had been watching. The ad 204 appears at the top of the grid. If the viewer presses the down arrow on his or her remote control device, the grid lines move up off the screen, and the lines of the grid scroll up under the ad 204. The ad 204 sticks in place until an addressable number of lines, sometimes referred to herein as a page, have scrolled beneath it, then unsticks and scrolls up off-screen with the text. As the ad 204 scrolls off the top of the grid, another ad scrolls up from the bottom, so that when the first ad has completely scrolled off screen, the new ad completely occupies the bottom three lines of the scrolling grid. If the viewer continues to scroll, the ad scrolls up into the highlight lens 214, which expands or "trombones" vertically and horizontally to accommodate the different size of the ad. This is shown in FIG. 5. If the viewer scrolls the ad out of the lens 214, it sticks in place when it reaches the top of the screen, restarting the cycle.

Figure 6:

If the viewer presses the up arrow, causing the grid lines to move down off the screen, the ad 204 sticks in place until an addressable number of lines, a page, have scrolled out from beneath it. The ad 204 then unsticks and scrolls into the lens 214, which expands as explained above and as shown in FIG. 5. If the viewer scrolls down further, the ad 204 reaches the bottom of the grid 200, as shown in FIG. 6, at which point it may stick or may scroll off the bottom of the screen. A new ad scrolls in from the top, and, when that entire ad is visible, it sticks in place, restarting the cycle. This provides that the ad 204 will be prominently visible for a set time, as determined by a set number of program cells scrolled, while the viewer uses the IPG to find a desired program to watch. At some point the ad scrolls off, making way for a new one.

The number of lines that scroll under the ad is addressable, so that it can be changed during the day to support greater or lesser repetition frequency. For example, if there are many ads in the set top box, the number of lines might be set to 15 to allow more ads to be shown over a shorter time. If there are few ads in the box, the number of lines could be set to 25, or even to the total number of lines in the grid, which would mean the ad wouldn't scroll off at all. As such, the page size is dynamically configurable per each instance of the ad banner table, as described further below. If a single 24-hour table is used, the page size is the same for the entire 24-hour period.

Figure 7:
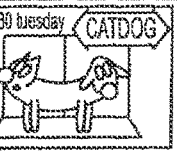

Further in accordance with embodiments of the invention, when an ad is not in the lens 214, left/right scrolling of the grid has no effect on the ad. The scrolling grid scrolls independently of the ad. Likewise, when an ad is in the lens, left/right scrolling has no effect on the grid. When an ad is in the lens, left/right scrolling causes the ads to scroll at the rate of one complete ad per left/right arrow execution. Ads are not "slippery" and do not get truncated as program cells do. If an ad is in the lens and the viewer presses the right arrow, the ad to the right of the ad in the lens scrolls into the lens, and a new ad scrolls in from off-screen to replace it, as shown in FIG. 7. Depending upon the size of an ad buffer, as described further below, the new ad may be the ad that was originally in the lens, or it may be an entirely new ad. If the system only supports two ads at a time, the same two ads will simply loop, as shown in FIG. 7, where the ad for Spin City moved in from the right as the new ad.

The number of ads that may be supported by a system simultaneously depends on set top box memory and bandwidth considerations. A minimum of two half-grid-wide ads or one full-grid-wide ad should be available at any time. Ads may be made available to the system in 30 minute blocks and for 60-second avails. The system also supports descriptive text, graphics or an HTML page about the ad to be sent and shown in a description box on the IPG grid screen.

The advertisement cell and inserted advertisement has many interactive capabilities as the program cells. For example, for ads for television programming, pressing an enter button on an ad in the highlight lens produces an action corresponding to the behavior of program cells when in the lens, as described in the above referenced related applications. This action includes tuning to the station of a currently airing show, marking a show for future viewing, or in the case of product-based advertising, taking the viewer to a virtual-channel or initiating an e-commerce purchase.

Advertisements may support the following additional functionality. They may be changed according to guide page, and may be replaced after scrolling through a defined number of channels. When scrolling, new ads should appear in a manner that leaves a full ad visible. Ads may change according to priority, current time, and category, as selected from the pick list. Ads may be set not to change until a viewer moves to a different page, after which time the ad updates as scheduled. Multiple ads may be associated with a page, and have a priority that determines when they will be displayed. The first time a page is viewed, the highest priority ad is displayed. Upon the next viewing occasion, the second highest priority ad is displayed, and so on, up to, in one embodiment, four priority levels. Default ads should appear when no ad is scheduled at a particular time, and will be indicated as such by assigning them the lowest priority. These ads may be sent as part of every ad banner table, as described below and in the attached Appendix, so that they need not be stored at startup.

Figure 8:

For a program guide which is list-based, FIG. 8 shows how two or more ads are arranged vertically. Vertically stacked ads are displayed when the viewer has displayed a category sort through use of the pick list 210, as shown in FIG. 8 in which the program choices for the news category are displayed.

Figure 9:
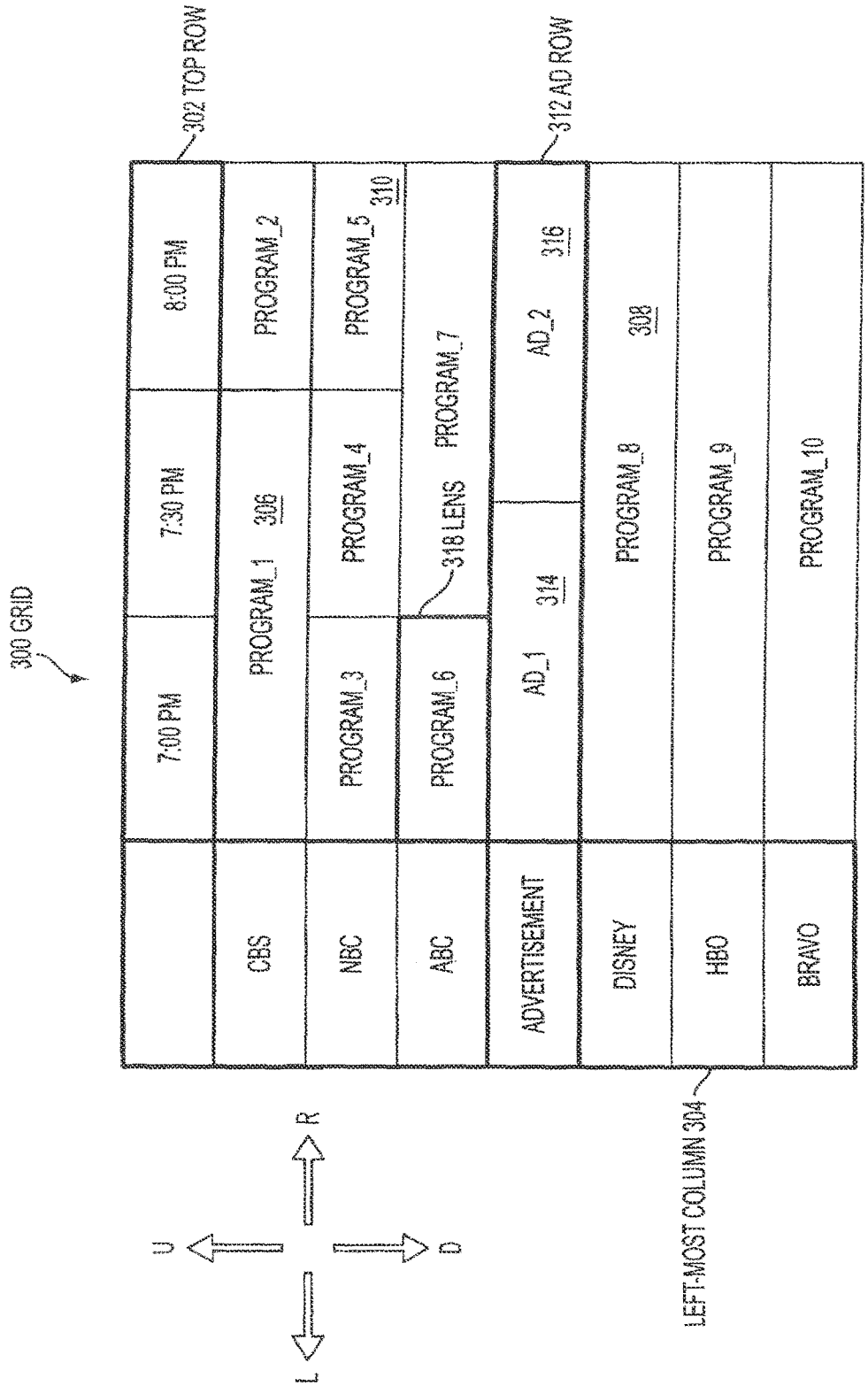
FIG. 9 shows a block diagram of an interactive program guide displayed on the television monitor of the digital broadcast system.

FIG. 9 shows in block diagram form an IPG as it may be representatively displayed on television monitor 114. The IPG contains scheduling data for the video channels. The scheduling data is arranged along rows and columns forming grid 300. In one embodiment of the present invention, the top row 302 displays time slots representatively shown in half-hour periods, and the left-most column 304 displays the names of video channels. Thus, according to the IPG shown in FIG. 9, program_1 displayed in cell 306 of grid 300 is scheduled for broadcast at 7:00 p.m. on the CBS channel. FIG. 9 shows scheduling data displayed in the rows of grid 300 for the following video channels between 7 p.m. and 8 p.m. (top to bottom in grid 300): CBS, NBS, ABC, Disney, HBO, and Bravo.

As further illustrated in FIG. 9, the cells of grid 300 have variable sizes. The cell size depends on the length of the program for a particular video channel. As an example, program_8 shown in cell 308 is at least 1 hour long, such that cell 308 occupies the entire row in grid 300. As another example, program_5 broadcast on the NBC channel is half-hour long and consequently occupies cell 310 which is one-third of the entire row and is smaller than cell 308. Hence, the cells of grid 300 containing program names and starting/ending at the columnar boundaries of time slots may have different sizes depending on the program length.

According to one aspect of the present invention, one row in grid 300 is occupied by advertising data instead of scheduling data described above, as shown in FIG. 9. In one embodiment of the present invention, the advertising data takes up row 312 of grid 300. Since the ad data does not start at a particular time slot as opposed to a particular program, the cells in ad row 312 are variably sized and do not have to start/end at the columnar boundaries of the time slots. For example, AD_1 occupies cell 314 which does not truncate at the time slot boundaries displayed in FIG. 9. Similarly, AD_2 occupying cell 316 is not restricted to the time slot boundaries for schedule data.

Further shown in FIG. 9 is lens 318 responsive to a remote control (not shown) operated by the viewer. By activating directional buttons (left, right, up, down) on the remote control, the viewer moves the lens 318 from one cell to another in grid 300. As described in detail in U.S. patent application Ser. No. 09/103,317, the lens may be stationary while the grid scrolls behind it. Alternatively, lens 318 may move or "slide" in a desired direction across the cell boundaries, or alternatively may "jump" to the next cell to accommodate the size of that cell when the viewer presses the directional button.

As also described in U.S. patent application Ser. No. 09/103,317, the current video program is presented to the viewer on the screen when the viewer presses a "Gimme" or enter button on the remote control, provided the activated video program is currently in progress. Alternatively, another function activated in response to the viewer pressing the "Gimme" button on the remote control allows the viewer to tag future video programs for later viewing or recording. Thoroughly explained in U.S. patent application Ser. No. 09/103,317, the description of these functions will not be repeated herein in order not to detract from the present invention.

The IPG data, including scheduling and advertising data, presented in grid 300 may be scrolled up, down, left or right in response to the viewer pressing directional buttons on the remote control. For example, when the viewer activates the "down" function to scroll the scheduling data in grid 300 in the direction of arrow D in FIG. 9, the program schedule data moves down. In accordance with the present invention, the advertisement in ad row 312 does not move down immediately but rather stays in the same position on the display, at least for a given number of program cells scrolled. In contrast to the embodiments described above with reference to FIGS. 3-8 in which the advertisement data became temporarily stationary at the top or bottom while a certain number of program cells scrolled past, the advertisement row 312 in this embodiment is shown to be temporarily stationary in the middle portion of the grid 300. The exact position of the advertisement during its period of temporary non-movement is a matter of design choice. Scheduling data for new video channels appear at the top of the grid while the scheduling data for video channels HBO and Bravo scrolls off the monitor screen.

Figure 10:
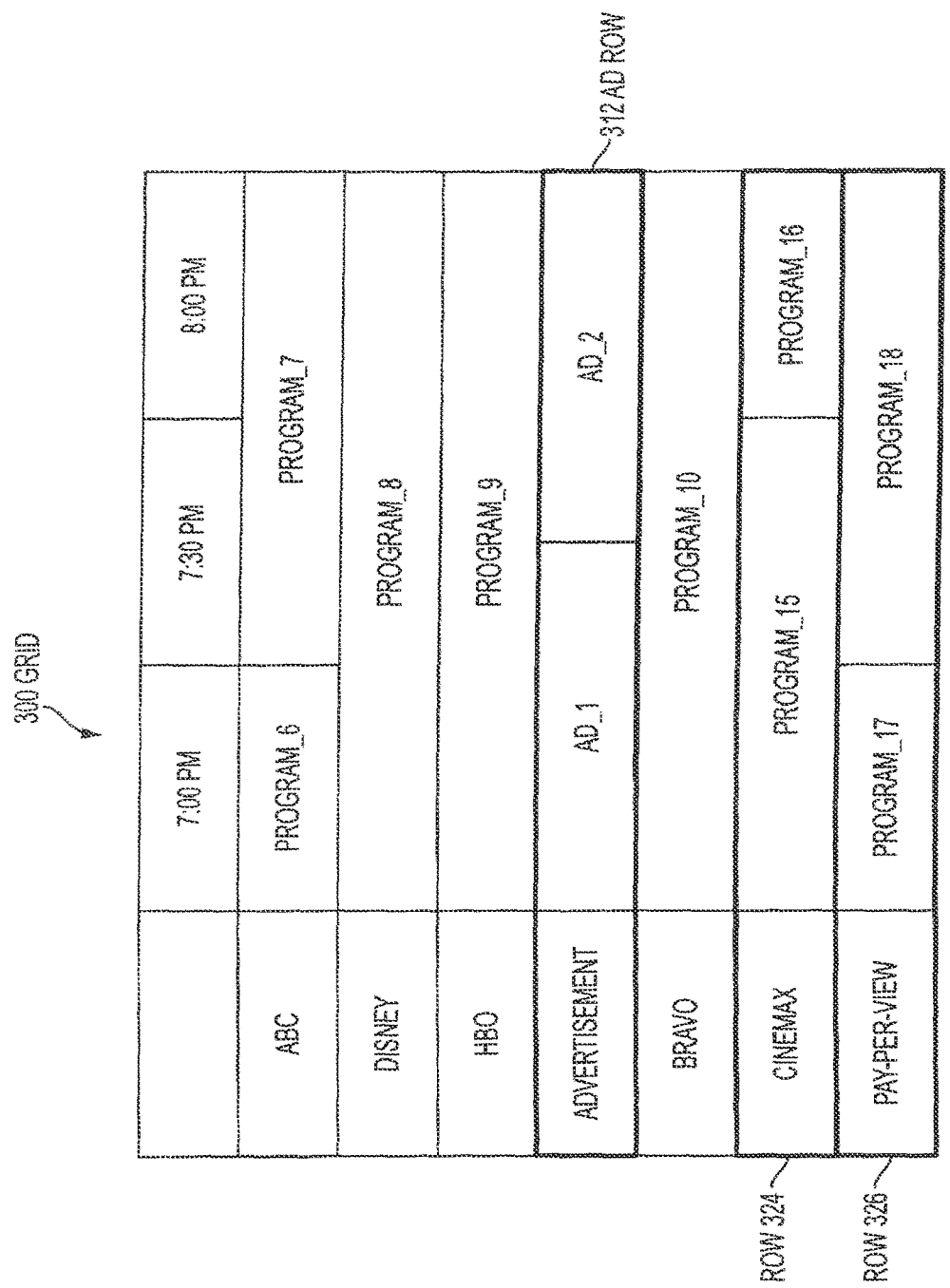
FIG. 10 shows a block diagram of the interactive program guide when the viewer activates the "up" function to scroll the scheduling data in grid 300 in the direction of arrow U in FIG. 9.

Similarly, when the viewer activates the "up" function to scroll the scheduling data in grid 300 in the direction of arrow U in FIG. 9, grid 300 acquires the appearance as shown in FIG. 10. Scheduling data for new video channels Cinemax and Pay-Per-View appears in rows 324 and 326, respectively, for time slots 7:00 p.m., 7:30 p.m. and 8:00 p.m., while the scheduling data for video channels CBS and NBC scrolls off the monitor screen. FIG. 10 shows grid 300 after the viewer moved it up by 2 rows such that the scheduling data is displayed in the rows for the following channels (top to bottom in grid 300): ABC, Disney, HBO, Bravo, Cinemax, Pay-Per-View. The advertisements in ad row 312 have not moved during this brief scrolling operation.

It is understood, of course, that the viewer may move the scheduling data within grid 300 by any number of rows.

FIG. 10 shows that ad row 312 containing the advertising data remains in the same position as before the scrolling operation of the scheduling data. As the viewer activates the "down" or "up" function for moving the scheduling data within grid 300, the scheduling data for 19 adjacent video channels (Disney, HBO in FIG. 10) scrolls underneath ad row 312 containing advertisements. The scheduling data re-appears below or above ad row 312 during the scrolling operation.

In one aspect of the present invention, the contents of ad row 312 are replaced with different advertising material after a predetermined number of channels are scrolled off the screen in response to the viewer using "up" and/or "down" buttons on the remote control device. As the viewer chooses to scroll the scheduling data up or down to view the scheduling information for other video channels, ad row 312 starts moving in the direction of the scrolling operation. As shown in FIG. 11, ad row 312 "unsticks" and moves in the scrolling direction, along with other video channels displayed in the grid 300, after a predetermined number of video channels are scrolled off the screen. Thus, as the viewer scrolls the scheduling data up or down in grid 300, ad row 312 starts moving as illustrated in FIG. 11.

After ad row 312 scrolls off the screen, another row of ad data 312 appears at the top or bottom of the screen, depending on the scrolling direction. Hence, if the previous ad data scrolls off the screen as shown in FIG. 11, new ad data in ad row 312 appears at the bottom of the screen as shown in FIG. 12. If the viewer continues the scrolling operation in the same direction, the new ad data in ad row 312 scrolls in that direction until it gets to a predetermined location on the screen. In this embodiment of the present invention, the predetermined location for the ad row is substantially in the center of the screen. At that time, the new advertising data in ad row 312 "sticks" in the predetermined location despite the viewer's scrolling operation of the scheduling data in grid 300. Of course, the viewer may reverse the scrolling direction prior to the new advertising data in ad row 312 reaching its destination. In this situation, ad row 312 does not "stick" anywhere, and instead, the new advertising data continues to scroll off the screen in the new direction and may once again re-appear on the screen from a different direction.

In another aspect of the present invention, the advertising data is related to substantially adjacent or nearby video channels displayed in grid 300. For example, AD_1 and AD_2 displayed in cells 314 and 316, respectively, as shown in FIG. 9 may be related to any one or more of the displayed video channels: CBS, NBC, ABC, Disney, HBO, and Bravo. When the viewer scrolls the scheduling data up or down in grid 300, the new ad appearing at the top or bottom of the screen is related to the nearby video channels as they appear in view. As a result, the advertising data is replaced according to the contents and names of the video channels that scroll onto the screen and become adjacent ad row 312 in grid 300.

Referring to FIG. 12, AD_3 in ad row 312 may be an advertisement for an adult program starting at 9:00 p.m. on the Playboy channel. The advertisement is related to the channel listing substantially adjacent or nearby ad row 312. In another example with reference to FIG. 12, AD_4 in ad row 312 may be an advertisement for an on-line discount broker. This advertisement is contextually related to the CNBC channel for broadcasting financial news and information, as known to those skilled in the art.

In another aspect of the present invention, if the viewer scrolls the scheduling data up or down causing the rows of grid 300 to move off the screen and causing the advertisements to move from the center row, the ads "stick" at the top and/or bottom of the screen depending on the scrolling direction. As shown in FIG. 13, the advertisements remain in the top schedule row 328 until a predetermined number of rows is scrolled beneath the ads. Then, the advertisements in the top schedule row 328 "unstick" and scroll off the screen. Alternatively, the ads in the top schedule row 328 may "unstick" and are replaced by a new advertisement based on the video channels that scroll into view and are in proximity of the top schedule row 328 in grid 300 as described hereinabove.

As briefly mentioned, the viewer may scroll the scheduling data in grid 300 to the left in the direction of arrow L or to the right in the direction of arrow R shown in FIG. 3. For example, when the viewer activates the "left" function to scroll the scheduling data in grid 300 in the direction of arrow L in FIG. 9, grid 300 has the appearance as shown in FIG. 14. The scheduling data for the same video channels as in FIG. 9 appears in grid 300 for the new time slots 5:30 p.m., 6:00 p.m. and 6:30 p.m. FIG. 14 shows grid 300 after the viewer moved it to the left by 3 columns.

Similarly, when the viewer activates the "right" function to scroll the scheduling data in grid 300 in the direction of arrow R in FIG. 9, grid 300 has the appearance as shown in FIG. 10. The scheduling data for the same video channels as in FIG. 9 appears in grid 300 for time slots 7:30 p.m., 8:00 p.m. and 8:30 p.m. FIG. 15 shows grid 300 after the viewer moved it right by 1 column.

FIGS. 14 and 15 further show that the advertising data "sticks" in ad row 312 remains in the same position as before the left scrolling or right scrolling operation of the scheduling data. That is, as the viewer activates the "left scroll" or "right scroll" function for moving the scheduling data within grid 300, the advertisements do not change. As explained above, this occurs when the advertisement data is not positioned in the lens 318 (the lens not being specifically shown in FIGS. 14 and 15). Left/right scrolling has no effect on the ads, and the scheduling data in grid 300 scrolls independently of the ads.

In yet another aspect of the present invention, the advertisements in ad row 312 are replaced during the left/right scrolling operation after browsing through a predetermined number of time slots for the scheduling data. A new ad scrolls into place from the scrolling direction on the screen at a representative rate of one complete advertisement per left/right arrow button press.

In still another aspect of the present invention, the replacement of ads in ad row 312 during the left/right scrolling operation is directly related to and depends on time slots displayed in grid 300. For example, AD_1 located in cell 314 shown in FIG. 9 may be an advertisement for a program that starts on the NBC channel at 8:00 p.m. If the viewer moves the scheduling data in grid 300 to the left, AD_1 and AD_2 located in ad row 312 may be replaced by AD_8 as shown in FIG. 16. AD_8 contains an advertisement for a program on the HBO channel that starts at 7:30 p.m.

Similarly, if the viewer moves the scheduling data in grid 300 to the right, AD_1 located in cell 314 may be replaced by AD_2 located in cell 316, and AD_9 is inserted in place of AD_2 as shown in FIG. 17. As an example, AD_9 may contain an advertisement for a program on the Bravo channel that starts at 10:30 p.m.

As described above, the viewer may move lens 318 from one cell to another over the entire grid, or may move the grid around while the lens stays stationary on the display and cells enter and leave it, in either case thereby selecting different cells. Using lens 318, the viewer may highlight the ad cell. In this situation, lens 318 "trombones" both vertically and horizontally in order to properly display the ad because the ad will generally not be the precise width of the grid columns surrounding it This "tromboning" action is functionally similar to the "tromboning" that takes place with program cells in the program guide; that is, lens 318 changes size dynamically as the ad scrolls into it. With ad cell scrolling, lens 318 "trombones" vertically and/or horizontally to accommodate the difference in height and/or width between ad cells and program cells.

In another aspect of the present invention, when the viewer selects the ad cell using lens 318 as described above, additional details of the ad may appear on the screen for a predetermined period of time. For example, when AD_1 in ad row 312 is in lens 318, more extensive text and/or images pertaining to that advertisement appear on the bottom half of the screen as shown in FIG. 18. After the expiration of the predetermined time period, AD_1 returns to its original condensed version to occupy cell 314.

The viewer may press a "Gimme" button on the remote control while the ad is in lens 318. The following operations may take place depending on the contents of the ad which was activated by the viewer. If the ad is for a currently airing program, or a program airing within a predetermined time period, pressing the "Gimme" button while the ad is in the lens takes the viewer to the channel showing the program. If the ad is for a program that is airing at some time in the future, pressing the "Gimme" button initiates a tag sequence at an appropriate point for later viewing. If the ad is for a Pay-Per-View event, pressing the "Gimme" button begins a buy sequence at an appropriate point to purchase the requested event. If the ad is for another product or service, pressing the "Gimme" button takes the viewer to the information page for that service. Alternatively, a store-and-forward or other type of purchase may be initiated for the advertised product or service upon pressing of the "Gimme" button.

Figure 19:
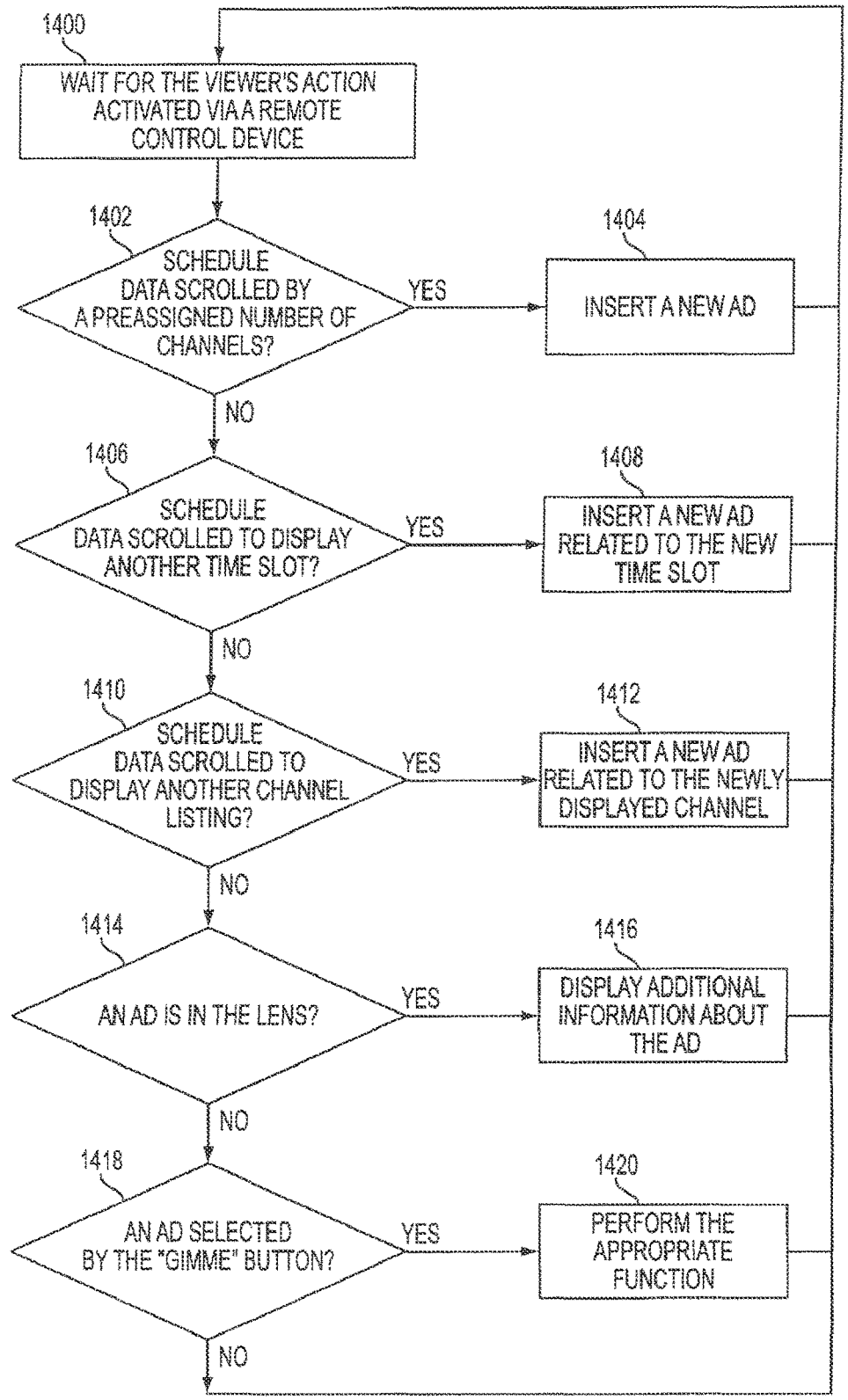
FIG. 19 is a flowchart for navigating an interactive program guide with advertisements according to one embodiment of the present invention.

FIG. 19 is a flowchart for displaying on a screen the interactive program guide with advertisements according to the present invention. In particular, FIG. 19 shows a process by which ads may be selected for insertion into the advertisement cell based upon navigational movement in the IPG. In block 1400, the viewer activates a particular function in the interactive program guide via the remote control device. In block 1402, a decision is made whether the viewer scrolled schedule data up or down in grid 300 by a predetermined number of channels. If so, a new ad is provided on the screen in block 1404. Otherwise, in block 1406, a decision is made whether the viewer scrolled the schedule data to display another time slot in grid 300. If so, a new ad related to the new time slot in grid 300 is inserted in ad row 312 in block 1408.

As further shown in FIG. 19, in block 1410 it is determined whether the viewer scrolled the schedule data to display another channel listing. If so, in block 1412 a new ad related to the new channel listing in grid 300 is provided in ad row 312. Otherwise, in block 1414 a decision is made whether the viewer placed lens 318 over the ad in row 312. If this is the case, additional information about the ad in the lens is displayed on the screen in block 1416. In block 1418, another decision is made whether the viewer selected an ad using the "Gimme" button. If so, in block 1420 various functions are performed depending on the contents of the ad as described above.

In the preferred embodiment, the top row displays time slots representatively shown in half-hour periods, and the left-most column on the screen displays the names of video channels. Those skilled in the art will recognize that the present invention is not limited to such implementation. Among other things, time slots in grid 300 may be of any duration, and the position of time slots and channel listing on the screen may be arranged differently. For example, time slots may occupy the bottom row, and the right-most column on the screen may be allocated to the channel listing.

Further in the preferred embodiment, the advertisements are displayed in substantially the center row of grid 300. Those skilled in the art, however, will recognize from the disclosure herein that the present invention is not limited thereto. Any row of grid 300 may be assigned to the ads.

Still further according to the present invention, one or several ads may appear in one row. Furthermore, the advertisements may occupy more than one row in grid 300.

Still further in the preferred embodiment, more extensive text and/or images pertaining to that advertisement appear on the bottom of the screen if the ad is highlighted by the lens 318. Those skilled in the art will recognize from this disclosure that additional text and/or images may occupy any portion of the screen, including any top portion.

FIG. 20 shows a data structure for storing data transmitted from a head end or other central station to subscriber stations having display devices. The data structure specifies the format of an ad table. The table defines the time(s) that an ad is ready for display in the program guide, the priority in the rotation sequence, the duration of its display for a given rotation, and its location within the guide. The table is sent to subscriber devices at regular intervals, such as in a rolling 12-hour present and following format. The definitions for the entries in the ad table in FIG. 20 are contained in the Appendix to this specification, which fully forms part of this application.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

APPENDIX

The Appendix, which forms part of the present application, contains the definitions for the fields in the advertisement delivery table shown in FIG. 20. Some of the terminology, including names of levels and zones, is best understood with reference to prior applications incorporated herein by reference, such as Ser. No. 09/018,541.

What is claimed is:

1. A method comprising:
receiving, from a remote location, a first parameter related to a scrolling operation, wherein the first parameter is stored in a data structure;
controlling, on a display device during a first time period, an interactive program guide such that a plurality of displayed program cells move based in part on the first parameter;
receiving, from the remote location, a second parameter; and
keeping a displayed advertisement substantially stationary during a second time period based in part on the second parameter, wherein the second time period is related to a subset of the plurality of displayed program cells which will scroll past the substantially stationary advertisement.

2. The method of claim 1 further comprising:
replacing the displayed advertisement based upon expiration of the second time period.

3. The method of claim 1 further comprising:
replacing the displayed advertisement based on a movement of a particular number of the plurality of displayed program cells.

4. The method of claim 1, wherein a cell of the plurality of displayed program cells includes a program choice available on demand.

5. The method of claim 1 further comprising:
receiving a selection of the displayed advertisement; and
marking a program choice associated with the displayed advertisement for future viewing.

6. The method of claim 1 further comprising:
inserting another advertisement related to the plurality of displayed program cells.

7. The method of claim 1 further comprising:
receiving a selection of the displayed advertisement, wherein the selection initiates an e-commerce purchase of a product or service related to the advertisement.

8. A computing system comprising:
a processor; and
an electronic device, the electronic device having a display device and being communicatively coupled to the processor, the processor configured to:
receive, from a remote location, a first parameter related to a scrolling operation, wherein the first parameter is stored in a data structure;
control, on the display device during a first time period, an interactive program guide such that a plurality of displayed program cells move based in part on the first parameter;
receive, from the remote location, a second parameter; and
keep a displayed advertisement substantially stationary during a second time period based in part on the second parameter, wherein the second time period is related to a subset of the plurality of displayed program cells which will scroll past the substantially stationary advertisement.

9. The computing system of claim 8 further comprising:
the processor configured to replace the displayed advertisement based upon expiration of the second time period.

10. The computing system of claim 8 further comprising:
the processor configured to replace the displayed advertisement based on a movement of a particular number of the plurality of displayed program cells.

11. The computing system of claim 8, wherein a cell of the plurality of displayed program cells includes a program choice available on demand.

12. The computing system of claim 8 further comprising:
the processor configured to receive a selection of the displayed advertisement; and
the processor configured to mark a program choice associated with the displayed advertisement for future viewing.

13. The computing system of claim 8 further comprising:
the processor configured to insert another displayed advertisement related to the plurality of displayed program cells.

14. The computing system of claim 8 further comprising:
the processor configured to receive a selection of the displayed advertisement, wherein the selection initiates an e-commerce purchase of a product or service related to the displayed advertisement.

15. A method comprising:
receiving, from a remote location, a first parameter related to a scrolling operation, wherein the first parameter is stored in a data structure;
controlling, on a display device during a time interval, an interactive program guide such that a plurality of displayed program cells move based in part on the first parameter;
receiving, from the remote location, a second parameter; and
keeping a displayed advertisement substantially stationary during another time interval based in part on the second parameter, wherein the another time interval is in relation to a subset of the plurality of displayed program cells which will scroll past the substantially stationary advertisement.

* * * * *

UNITED STATES PATENT AND TRADEMARK OFFICE
CERTIFICATE OF CORRECTION

PATENT NO. : 9,860,609 B2  
APPLICATION NO. : 15/071826  
DATED : January 2, 2018  
INVENTOR(S) : Gerba et al.

It is certified that error appears in the above-identified patent and that said Letters Patent is hereby corrected as shown below:

In the Specification

In Column 1, Line 8, after the word "No.", delete "13/939,347" and insert therefor --13/939,947--.

Signed and Sealed this  
Twenty-fourth Day of July, 2018

Andrei Iancu  
*Director of the United States Patent and Trademark Office*